J. A. BENNETT.
Car Propeller.
No. 30,287.
2 Sheets—Sheet 1.
Patented Oct. 9, 1860.
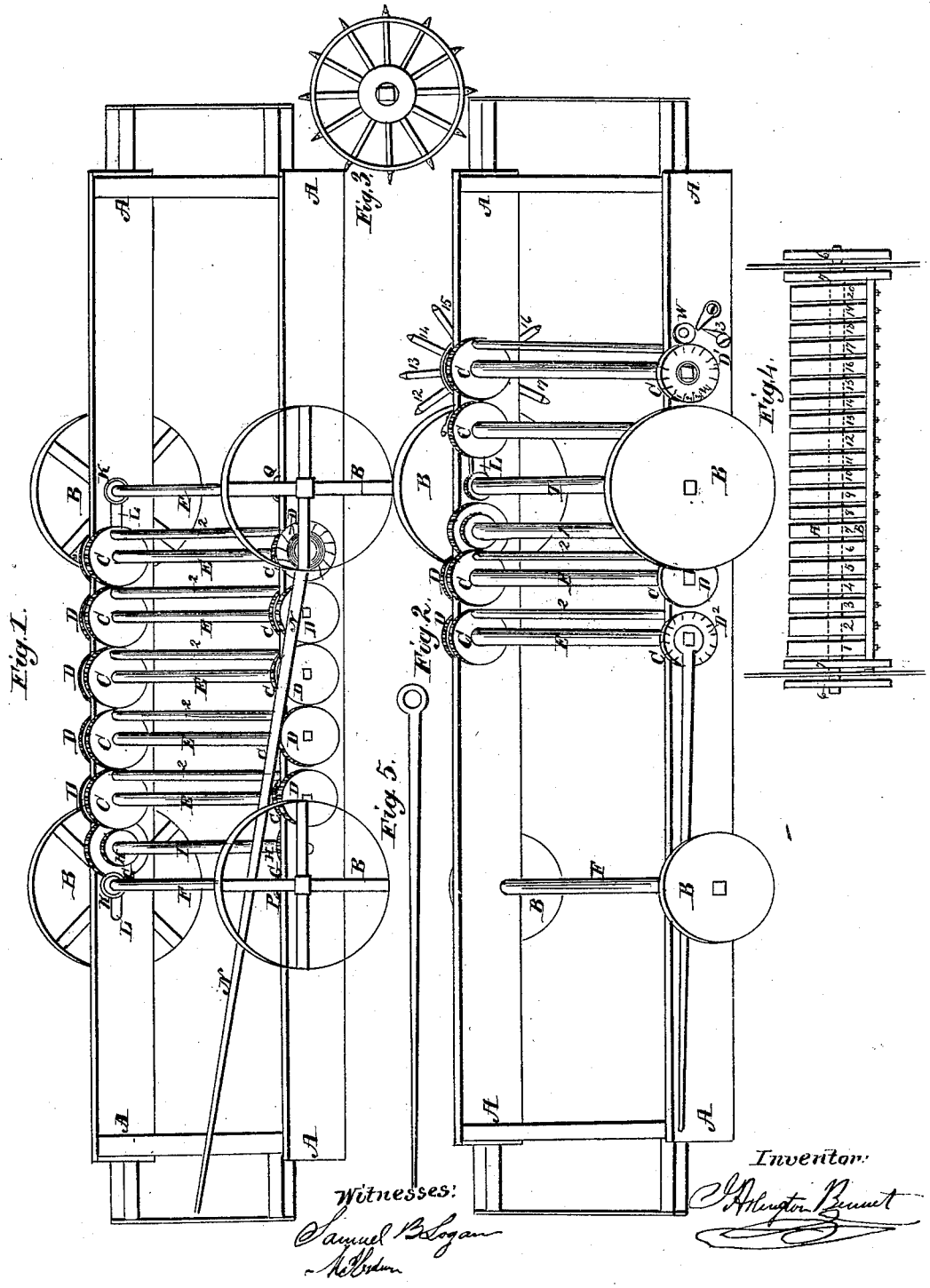
Witnesses:
Samuel B. Logan
Inventor:
J. Arlington Bennett J. A. BENNETT.
Car Propeller No. 30,287.

2 Sheets—Sheet 2

Patented Oct. 9, 1860.

Witnesses,
Samuel B. Logan

Inventor:
J. Arlington Bennett

UNITED STATES PATENT OFFICE.

J. ARLINGTON BENNET, OF KINGS COUNTY, NEW YORK.

PROPELLING CARS ON RAILROADS.

Specification of Letters Patent No. 30,287, dated October 9, 1860.

*To all whom it may concern:*

Be it known that I, JAMES ARLINGTON BENNET, residing in the county of Kings and State of New York, have invented a new and useful machine for propelling machinery, cars on railroads, and other vehicles on land and water by a new arrangement, application, and combination of springs, cog-wheels, ratchets, and levers; and I do hereby declare that the following is a full, clear, and exact description of the construction and operation of the same, reference being had to the annexed drawings, making a part of this specification, in which—

Figure 1:
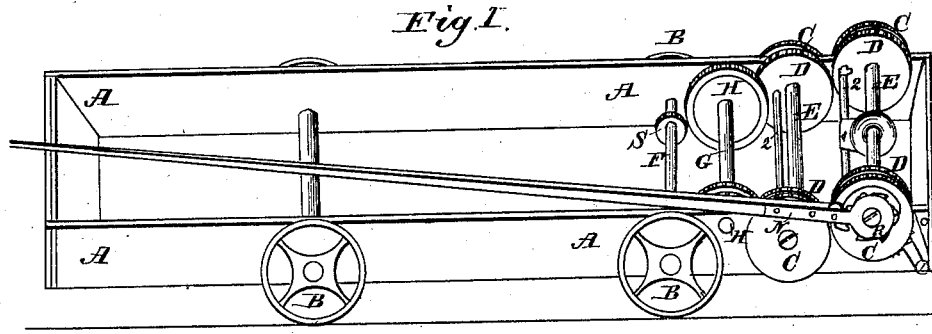
Figure 2:
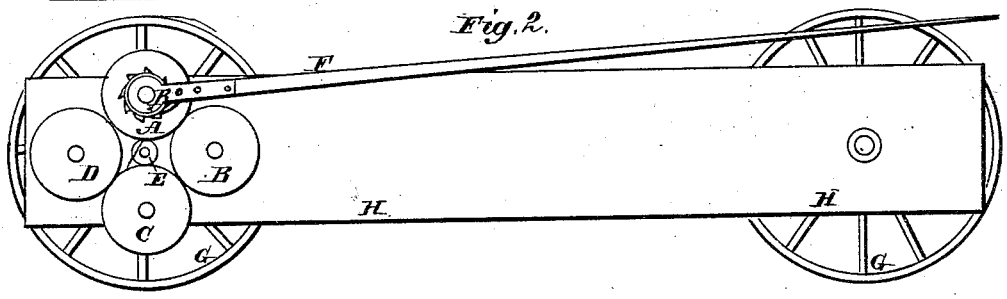
Figure 3:
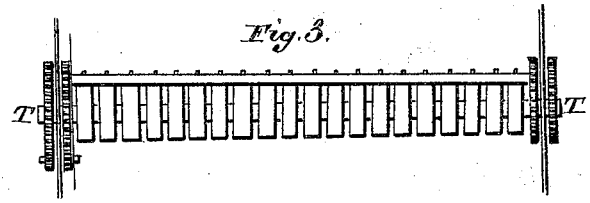
Figure 4:

Figure 1 is a perspective view of one of the modes of its construction, and action representing the model. Fig. 2 another mode of combining the cog wheels, shown in a side view, the other parts being the same in principle as in Fig. 1. Fig. 3 shows a row of springs detached from its place and Fig. 4 represents the construction of the ratchet and lever.

In Fig. 1, A A A A represent the sides of a car; B B B B, the 4 track wheels, which support and carry the car.

C C are two cog wheels with their opposites on the axles on the inside of the frame of the car each of which is to carry a row of any required number of springs, as in Fig. 3, to be wound up between $E^2$ on each row, by the lever H H attached to the ratchet R, or by a lever and ratchet on each side on the wheel C which connects by cogs with all the other wheels marked C, on the inside of the sides of the car. The two axles E and their wheels C (or any number of axles more or less) when the springs are wound up are fixed, but the bars carrying one end of the springs 22 with the wheels D revolve around them when the machine is in motion. Both rows, or as many as there may be, acting together, by the wheels D D on the wheels H H fixed on each end of G and then H H work into the small wheels on the axle F on both sides, so that the large wheels or outside wheels B B will move in the direction of R 8 times or any number of times more or less as the speed may desire for every single revolution of any of the wheels marked D. The springs are wound on E while the outer ends are on 2. That the springs may all pull together every other row must be reversed in fixing them on their axles $E^2$ $E^2$. In high powers a lever on each side or even 4 levers may be applied to work together or alternately. A lever of 12 feet long on the ratchet 5 inches diameter is equal to a power of 10,000 lbs. or that of 25 horses of 400 lbs. pull to the horse, when a man of 170 lbs. weight works at the extreme end. Those acquainted with statics can prove this.

In Fig. 2 H H is the left hand side of a car looking into the ratchet R as the front; G G the right hand side outside wheels; A B C D four cog wheels, their opposites, as shown at D D in Fig. 1, being on the inside of the side H H which work into each other in propelling the car, as at the small wheels S, Fig. 1. The small wheel E in Fig. 2 instead of being on the outside is to be on the inside, as at S, there being none but the wheels A B C D which work into each other in winding up by the lever and ratchet R E. In this plan there are 16 cog wheels, 8 inside and 8 outside of the sides of the car, and 2 small wheels fixed on the axle as at S in Fig. 1. A lever on each side will wind up the whole equal to 50 horses.

What I claim as my invention and desire to secure by Letters Patent is—

The combination and arrangement of the entire machine for propelling machinery, cars on railroads and other vehicles as described in this specification consisting of springs, cog wheels, ratchets and levers.

JAMES A. BENNET.

Witnesses:
M. I. CROHAN,
S. B. LOGAN.